United States Patent
Zhan et al.

(10) Patent No.: US 10,892,810 B2
(45) Date of Patent: Jan. 12, 2021

(54) APPARATUS AND METHOD FOR DYNAMICALLY SELECTING BEAMFORMING CODEBOOK AND HIERARCHICALLY GENERATING BEAMFORMING CODEBOOKS

(71) Applicant: Samsung Electronics Co., Ltd., Gyeonggi-do (KR)

(72) Inventors: Qi Zhan, San Diego, CA (US); Hongbing Cheng, San Diego, CA (US); Kee-Bong Song, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/735,042

(22) Filed: Jan. 6, 2020

(65) Prior Publication Data

US 2020/0358512 A1 Nov. 12, 2020

Related U.S. Application Data

(60) Provisional application No. 62/846,170, filed on May 10, 2019.

(51) Int. Cl.
*H04B 7/06* (2006.01)
*H04B 7/0456* (2017.01)

(52) U.S. Cl.
CPC ......... *H04B 7/0639* (2013.01); *H04B 7/0478* (2013.01); *H04B 7/0617* (2013.01); *H04B 7/0626* (2013.01)

(58) Field of Classification Search
CPC .. H04B 7/0639; H04B 7/0617; H04B 7/0626; H04B 7/0478

USPC ........................................................ 375/267
See application file for complete search history.

(56) References Cited

U.S. PATENT DOCUMENTS

| | | | |
|---|---|---|---|
| 8,761,297 B2 | 6/2014 | Erell et al. | |
| 8,971,272 B2 | 3/2015 | Kim et al. | |
| 9,872,296 B2 | 1/2018 | Raghavan et al. | |
| 2018/0146419 A1 | 5/2018 | Raghavan et al. | |
| 2018/0368142 A1* | 12/2018 | Liou | H04W 16/14 |
| 2019/0123864 A1* | 4/2019 | Zhang | H04B 7/0695 |

(Continued)

FOREIGN PATENT DOCUMENTS

| | | | | |
|---|---|---|---|---|
| WO | WO-2017197237 | | 11/2017 | |
| WO | WO-2019056182 A1 * | | 3/2019 | .......... H04B 7/0695 |
| WO | WO-2019127403 A1 * | | 7/2019 | .............. H04B 7/08 |

*Primary Examiner* — Hirdepal Singh
(74) *Attorney, Agent, or Firm* — The Farrell Law Firm, P.C.

(57) ABSTRACT

An apparatus and method for dynamically selecting a beamforming codebook and hierarchically generating beamforming codebooks is provided. According to one embodiment, an apparatus includes a channel estimation processor configured to receive a signal using a current beamforming codebook in a current beam sweeping period; a look-up table configured to store a plurality of beamforming codebooks; a state abstraction processor connected between the channel estimation processor and the look-up table, and configured to determine a codebook index based on a current channel condition as a function of the received signal and the current beamforming codebook, and select one of the plurality of beam sweeping codebooks in the look-up table as the beamforming codebook for the next beam sweeping period based on the codebook index.

20 Claims, 12 Drawing Sheets

(56) References Cited

U.S. PATENT DOCUMENTS

| | | | |
|---|---|---|---|
| 2019/0190574 A1* | 6/2019 | Chen | H04B 7/0482 |
| 2019/0222279 A1* | 7/2019 | Xi | H04W 72/00 |
| 2019/0288766 A1* | 9/2019 | Ng | H04B 7/088 |
| 2020/0007200 A1* | 1/2020 | Schreck | H04L 5/0051 |
| 2020/0007222 A1* | 1/2020 | Ruder | H04B 7/086 |
| 2020/0021351 A1* | 1/2020 | Tang | H04W 16/28 |
| 2020/0067588 A1* | 2/2020 | Jin | H04B 7/0626 |

* cited by examiner

APPARATUS AND METHOD FOR DYNAMICALLY SELECTING BEAMFORMING CODEBOOK AND HIERARCHICALLY GENERATING BEAMFORMING CODEBOOKS

CROSS-REFERENCE TO RELATED APPLICATION(S)

This application claims priority under claims priority under 35 U.S.C. § 119(e) to U.S. Provisional Application No. 62/846,170, filed on May 10, 2019, in the USPTO, the entire content of which is incorporated herein by reference.

FIELD

One or more aspects of embodiments according to the present disclosure relate to wireless communication systems, and more particularly to an apparatus and a method for dynamically selecting a codebook and generating hierarchical codebooks for analog beamforming.

BACKGROUND

In a radio frequency (RF) receiving or transmitting system with an array of antennas for frequency-division multiplexed communications, when only one RF chain is available, entry-wise elements of the channel may not be accessible. Instead, in each time or frequency resource, a linear combination of the elements may be obtained. This may be the case, for example, in a system for millimeter-wave (mm-wave) communications, in which the high power consumption of mixed signal components, and the high cost of RF chains, may make it costly to realize digital baseband beamforming, of the kind that may be used in lower-frequency multiple-input multiple-output (MIMO) systems. In such a system for mm-wave communications, analog beamforming may instead be used; all the antennas (of the array) may share a single RF chain and have weights of the same amplitude, i.e., a constant-amplitude constraint may apply to their weights.

The linear combination may be obtained using a phase shifter vector that may be referred to as a beamforming codeword; a set of such vectors, one for each beam to be formed, may be referred to as a beamforming codebook. The codebook may be represented as an array, each column of the array being a codeword corresponding to a respective beamforming codeword.

SUMMARY

According to one embodiment, an apparatus for determining a beamforming codebook for a next beam sweeping period is provided. The apparatus includes a channel estimation processor configured to receive a signal using a current beamforming codebook in a current beam sweeping period; a look-up table configured to store a plurality of beamforming codebooks; a state abstraction processor connected between the channel estimation processor and the look-up table, and configured to determine a codebook index based on a current channel condition as a function of the received signal and the current beamforming codebook, and select one of the plurality of beam sweeping codebooks in the look-up table as the beamforming codebook for the next beam sweeping period based on the codebook index.

According to one embodiment, a method of determining a beamforming codebook for a next beam sweeping period is provided. The method includes receiving, by a channel estimation processor, a signal using a current beamforming codebook in a current beam sweeping period; storing, in a look-up table, a plurality of beamforming codebooks; determining, by a state abstraction processor connected between the channel estimation processor and the look-up table, a codebook index based on a current channel condition as a function of the received signal and the current beamforming codebook; and selecting one of the plurality of beam sweeping codebooks in the look-up table as the beamforming codebook for the next beam sweeping period based on the codebook index.

According to one embodiment, an apparatus for generating a plurality of beamforming codebooks is provided. The apparatus includes a channel estimation processor configured to obtain $M^{L-1}$ sets of channel samples as current sets of channel samples, where M is an integer and L is greater than or equal to 1; a codebook generation processor connected to the channel estimation processor, wherein the codebook generation processor is configured to (a) select a codebook learning function for each set of current sets of channel samples; and a channel sample selection processor connected to the codebook generation processor, wherein the channel sample selection processor is configured to (b) divide the channel samples within each set of current sets of channel samples into M subsets as current sets of channel samples, wherein the channel sample selection processor determines whether L is equal to a predetermined value, wherein the channel sample selection processor determines whether L is equal to a predetermined value, and wherein the channel sample selection processor instructs the codebook generation processor to repeat (a) and wherein the channel sample selection processor repeats (b) if L is not equal to a predetermined value.

According to one embodiment, a method of generating a plurality of beamforming codebooks is provided. The method includes (a) obtaining, by a channel estimation processor, $M^{L-1}$ sets of channel samples as current sets of channel samples, where M is an integer and L is greater than or equal to 1; (b) selecting, by a codebook generation processor connected to the channel estimation processor, a codebook learning function for each set of current sets of channel samples; (c) dividing, by a channel sample selection processor connected to the codebook generation processor, the channel samples within each set of current sets of channel samples into M subsets as current sets of channel samples; (d) determining, by the channel sample selection processor, whether L is equal to a predetermined value; and (e) returning to (b) if L is not equal to the predetermined value.

BRIEF DESCRIPTION OF THE DRAWINGS

These and other features and advantages of the present disclosure will be appreciated and understood with reference to the specification, claims, and appended drawings in which:

DETAILED DESCRIPTION

Figure 1:
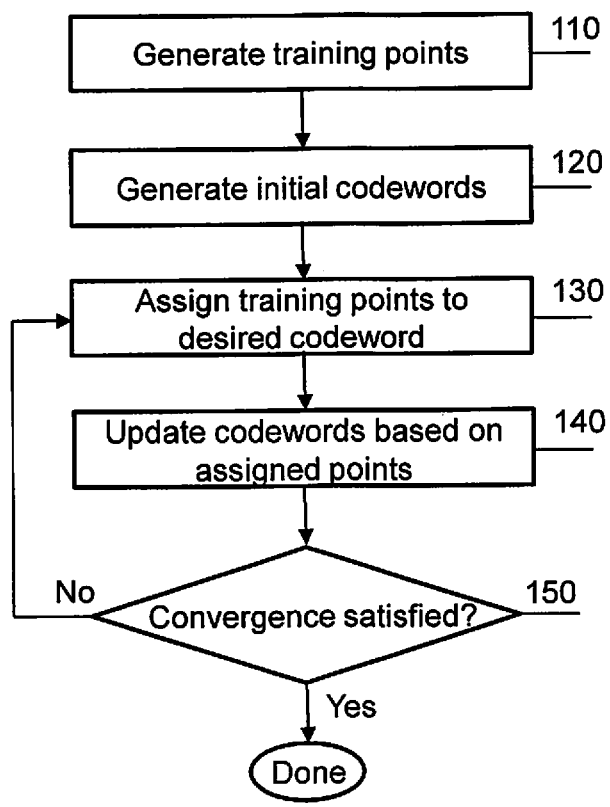
FIG. 1 is a flowchart of a method for generating a codebook, according to an embodiment.

The detailed description set forth below in connection with the appended drawings is intended as a description of exemplary embodiments of a system and method for generating a codebook for analog beamforming provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

To form a codebook for analog beamforming, if sufficient time and/or frequency resources are available to sweep a sufficient number of beams, it may be possible to estimate the elements of the channel matrix and direct the beam direction toward an (approximate) significant eigenvector of the channel matrix. However, for a large size antenna array, and if the available sweeping resources are limited, acquisition of the channel state information matrices may be challenging.

In an alternate method that may be referred to as "selection-based" beamforming, a set of codewords, i.e., a set of phase shifter vectors, is designed and used in the beam sweeping phase. After evaluating the codewords of the pre-designed codebook, one which optimizes a performance metric is chosen and used in successive transmissions.

Without loss of generality, the receiver side with antenna arrays of N elements may be considered; the same codebook may be used for transmit beamforming. It will be understood that although some embodiments are described herein in the context of a single antenna array and a single RF chain, the methods of codebook design described herein may readily be extended to multiple antenna arrays and multiple RF chains. The antenna array may have any shape, e.g., it may be a uniform linear array (ULA) or a uniform planar array (UPA).

The received signal may be written as in Equation (1) as follows:

$$y = \sqrt{P_{tot}} w_R^H h s + w_R^H n \qquad (1)$$

where s denotes the transmitted symbol with unit power, $w_R$ is the N×1 receive beamforming vector, h is the N×1 channel vector and n is the Gaussian noise vector with power $N_0$ i.e., $E(nn^H) = N_0 I_N$.

The total power radiated from the transmitter is, thus, equal to $P_{tot}$ and the total transmission signal to noise ratio (SNR) may be defined as $$\delta_T = \frac{P_{tot}}{N_0}.$$

As such, the received SNR at the receiver may be defined as $\delta_R = \delta_T |w_R^H h|^2$, where the total beamforming power gain due to beamforming at the transmitter and the receiver may be denoted as:

$$G_B = \frac{\delta_R}{\delta_T} = |w_R^H h|^2.$$

The symbol $\mathcal{W}(N)$ may be used to denote a set of vectors with N entries as in Equation (2) as follows:

$$\mathcal{W}(N) = \left\{ \frac{1}{\sqrt{N}} [e^{j\theta_1}, e^{j\theta_2}, \ldots, e^{j\theta_N}] \,\middle|\, \theta_i \in [0, 2\pi), \right. \qquad (2)$$
$$\left. i = 1, \ldots, N \right\}$$

where $$\frac{1}{\sqrt{N}}$$

is a normalization factor such that all the vectors have unit power. Consequently, $w_R \in \mathcal{W}(N)$. The non-convexity of this feasible set may be a factor making analog beamforming challenging. A subset of the feasible set may be selected as the codebook; this selection may be performed such that an overall performance metric obtained by beam sweeping and beam selection is sufficiently good.

One example of a codebook for a two-dimensional uniform planar array, which may be referred to as a "linear progressive" codebook, has the property that antenna ($m_h$, $m_v$) applies the phase shifter rotation in Equation (3) as follows:

$$w_{m_h, m_v} = \frac{1}{\sqrt{n_h n_v}} \exp\left(-j2\pi\left((m_v - 1)\frac{d_v}{\lambda}\cos(\theta_{etilt}) + \right.\right. \qquad (3)$$
$$\left.\left. (m_h - 1)\frac{d_h}{\lambda}\sin(\theta_{etilt})\sin(\phi_{escan})\right)\right)$$
$$m_h = 1, \ldots, n_h \, m_v = 1, \ldots, n_v$$

where $n_h$ and $n_v$ are the number of antenna elements in the horizontal and vertical directions, respectively, $\theta_{etilt}$ is the electrical down-tilt steering angle, and $\phi_{escan}$ is the electrical horizontal steering angle. As used herein, the "down-tilt" angle is the angle of declination (or angle of depression) (measured from the horizontal), i.e., it is the opposite of the elevation angle of the same direction. As used herein, the "horizontal" angle is the azimuth angle, measured from an axis of the antenna (e.g., measured from an axis that is perpendicular to the plane of the antenna, for a planar antenna array). The peak direction of the beam pattern may be at $\theta_{peak}=\theta_{etilt}$, $\phi_{peak}=\phi_{escan}$, with isotropic antenna elements.

If $m_h=1$, the two-dimensional array will reduce to a uniform linear array with $n_v$ antenna elements and the linear progressive codebook simplifies to a codebook that may be referred to as a discrete Fourier transform (DFT) codebook as in Equation (4) as follows:

$$w_{m_v} = \frac{1}{\sqrt{n_v}} \exp\left(-j2\pi(m_v - 1)\frac{d_v}{\lambda}\cos(\theta_{etilt})\right) \quad (4)$$

$$m_v = 1, \ldots, n_v$$

where $\theta_{etilt}$ is the peak direction of the beam pattern. Codebook design with linear progressive or DFT codewords may consist of (e.g., include) finding the peak points of beam patterns $\theta_{etilt}$, $\phi_{escan}$ such that the codebook satisfies some criteria.

In some embodiments, a codebook is generated, without imposing any particular structure on the beam vectors and their patterns, such that the codebook maximizes the metric in Equation (5) as follows:

$$J = E_h\left\{f\left(\max_{k=1,\ldots,K} |w_k^H h|^2\right)\right\} \quad (5)$$

$$s.t. w_k(n) = e^{j\theta_k(n)}, n = 1, \ldots, N$$

where maximization is over the codewords and the average is with respect to the channel vectors.

Instead of designing codewords with specific beam patterns, a learning-based method is used, in some embodiments, to design the codebook, based on selected training points. In some embodiments, the method proceeds as follows, as illustrated in FIG. 1. The present system generates L training points of $h_l$, $l=1, \ldots, L$ (at 110). The present system generates a plurality of initial values for a respective plurality of codewords, $w_k$, $k=1, \ldots, K$ (at 120). The present system assigns (at 130) each of the training points to a respective "desired" codeword using the assigning rule:

$$\max_{k=1,\ldots,K} |w_k^H h_l|^2, l = 1, \ldots, L.$$

The present system updates (at 140) the codeword for each set of assigned training points. The present system outputs (at 150) the final codebook, $\{w_k\}$, $k=1, \ldots, K$ if convergence is achieved, if convergence is not achieved, the present system returns to the step of assigning (at 130) each of the training points to a respective "desired" codeword.

In some embodiments, the codebook that results from performing the present method maximizes the metric in Equation (6) as follows:

$$J = E_h\left\{f\left(\max_{k=1,\ldots,K} |w_k^H h|^2\right)\right\} \quad (6)$$

$$s.t. w_k(n) = e^{j\theta_k(n)}, n = 1, \ldots, N$$

where maximization is over the codewords and the average is with respect to the channel vectors.

The training points may be empirical points obtained by measurements or drawn from some distribution based on the characteristics of the system. For example, measurements may be performed by transmitting a signal from a mobile antenna (or receiving a signal by a mobile antenna) of a mobile device, for a large number of positions of the mobile device, and, at each position, measuring the channel vector; each such measurement (performed at a respective mobile device position) may then correspond to one of the training points. In other embodiments, a set of training points based on uniform coverage (e.g., uniformly distributed over a sphere, or uniformly distributed in down-tilt angle (over a range of down-tilt angles) and horizontal angle (over a range of horizontal angles) may be used. Uniformly distributed training points may be uniformly spaced or randomly selected from a uniform distribution (e.g., each training point may be a pseudorandom point generated based on a uniform distribution (e.g., a uniform spherical distribution or a distribution that is uniform over a range of horizontal angles and uniform over a range of down-tilt angles)).

The generation of the initial values (at 120) may be performed by, for example, using a DFT codebook, or the codebook designed by other methods, such as a method described in Xiao, Z., He, T., Xia, P. and Xia, X. G., 2016. Hierarchical codebook design for beamforming training in millimeter-wave communication. *IEEE Transactions on Wireless Communications*, 15(5), pp. 3380-3392, which is incorporated herein by reference. In some embodiments, the algorithm is run multiple times, with random starts, and the best codebook is chosen from among the respective codebooks that result from the runs.

The assigning of the training points (at 130) may be performed as follows. In each iteration, the training point $h_l$ may be assigned to a codeword $w_k$, where $$k = \arg\max_{j=1,\ldots,K} |w_j^H h_l|^2.$$

In some embodiments, the number of training points may exceed (e.g., may greatly exceed, by a factor of 1000 or more) the number of codewords, so that each codeword may have assigned to it (at 130), multiple (e.g., a large number of) training points.

The updating of the codewords (at 140) may be performed as follows. In each iteration, the kth codeword is updated as:

$$w_k^{updated} = \arg\max_w J_k(w), \text{ where } J_k = \frac{1}{|\Omega_k|}\sum_{h_l \in \Omega_k} f(|w^H h_l|^2), \text{ and}$$

$\Omega_k = \{h_l | |w_k^H h_l|^2 > |w_j^H h_l|^2, j=1, \ldots, K-\{k\}\}$ (e.g., $\Omega_k$ is the set of training points assigned to the codeword (at 130)). The metric function $f(\cdot)$ may be any function, including, for example, $f(x)=x$ (a measure of average beamforming gain), $f(x)=\log(x)$ (a measure of capacity), $f(x)=Q(x)$ (a measure of "reciprocal bit error rate" i.e., a measure of the reciprocal of the bit error rate (BER)) and $f(x)=\text{sign}(x-\gamma)$ (a measure of coverage). The maximization involved in finding $$w_k^{updated} = \underset{w}{\mathrm{argmax}} J_k(w)$$

may be performed as follows. This maximization may involve finding the codeword that maximizes:

$$J_k = \frac{1}{|\Omega_k|} \sum_{h_l \in \Omega_k} f(|w^H h_l|^2) \, s.t. \, w.(n) = e^{j\theta(n)}, n = 1, \ldots, N$$

where $f(\cdot)$ may be any suitable metric function (examples of which are mentioned above). A gradient descent method may be used to update the codewords in each iteration. Such a gradient descent method may be employed with any differentiable function. The derivative of $J_k$ with respect to the vector $\theta_k$ may be denoted as in Equation (7) as follows:

$$\frac{\partial J_k}{\partial \theta_k} = \frac{1}{|\Omega_k|} \sum_{l=1}^{|\Omega_k|} \frac{\partial f}{\partial x} \frac{\partial x}{\partial w_k} \frac{\partial w_k}{\partial \theta_k} \quad (7)$$

This expression, $$\frac{\partial J_k}{\partial \theta_k}$$

may be calculated as in Equation (8) as follows:

$$\frac{\partial J_k}{\partial \theta_k} = \frac{1}{|\Omega_k|} \sum_{l=1}^{|\Omega_k|} f'(|w_k^H h_l|^2) w_k^H h_l h_l^H \Theta_k \quad (8)$$

where $\Theta_k$ is a diagonal matrix whose nth diagonal element is equal to $je^{j\Theta_k(n)}$. Then, the corresponding codeword may be updated iteratively (e.g., $N_{iter}=100$) using a gradient descent algorithm as $$\theta_k^{(i+1)} = \theta_k^{(i)} + \epsilon \frac{\partial j_k}{\partial \theta_k^{(i)}},$$

where $\in$ is the step size, which may be tuned, for example, to balance speed of convergence against stability. In some embodiments, another iterative method, e.g., a stochastic gradient descent algorithm, is used instead of the gradient descent method described above.

As such, the updating (at 140) of the codeword for each set of assigned training points, $\Omega_k$, k=1, . . . , K, may include repeating the gradient descent updating rule, i.e., $$\theta_k^{(i+1)} = \theta_k^{(i)} + \epsilon \frac{\partial J_k}{\partial \theta_k^{(i)}}$$

for $N_{iter}$ iterations.

Figure 2:
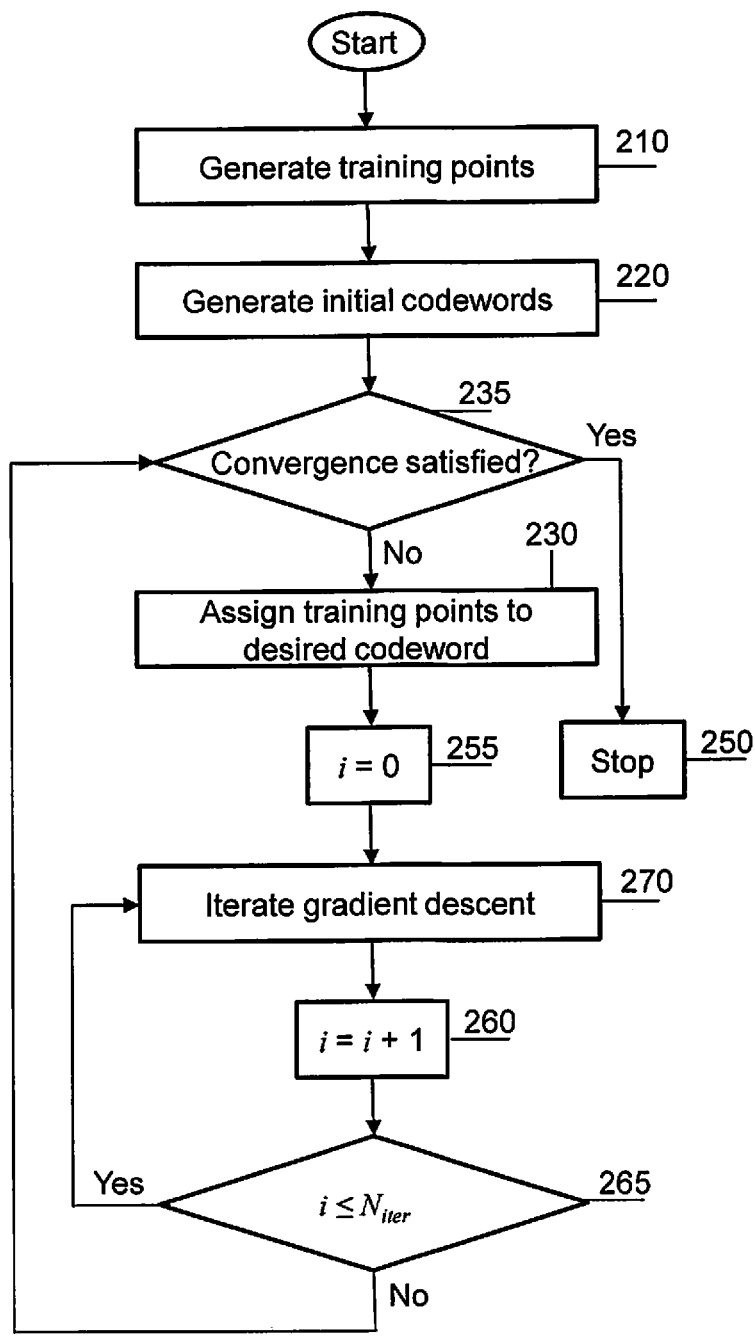
FIG. 2 is a flowchart of a method for generating a codebook, according to an embodiment.

FIG. 2 shows this process, in some embodiments, the present system generates L training points of $h_l$, l=1, . . . , L (at 210). The present system generates a plurality of initial values for a respective plurality of codewords, $w_k$, k=1 . . . , K (at 220). The present system tests (at 235) whether convergence is achieved, or "satisfied", and repeats steps 230, 255, 270, 260, and 265 until it is. At 230, the present system assigns each of the training points to a respective desired codeword using the assigning rule:

$$\max_{k=1,\ldots,K} |w_k^H h_l|^2, l = 1, \ldots, L.$$

A loop counter is used at 255, 260, and 265 to iterate an inner loop a set number of times ($N_{iter}$). Each iteration of the inner loop executes, at 270, the gradient descent updating rule, i.e., $$\theta_k^{(i+1)} = \theta_k^{(i)} + \epsilon \frac{\partial J_k}{\partial \theta_k^{(i)}}$$

once. The present system stops at 250), if convergence is achieved, outputting the final codebook, $\{w_k\}$, k=1, . . . , K; if convergence is not achieved, the present system returns to the step of assigning (at 230) each of the training points to a respective desired codeword.

The determination of whether convergence is achieved (or "satisfied") (at 150 in FIG. 1, or at 235 in FIG. 2) may be implemented in different ways, including (i) determining whether the number of iterations (e.g., of steps 130 through 150 in FIG. 1) equals a pre-defined number (ii) determining whether the metric to be optimized (i.e., the value $$J = E_h \left\{ f\left( \max_{k=1,\ldots,K} |w_k^H h|^2 \right) \right\}$$

) is larger than a pre-defined value, (iii) determining whether the change in this metric, between two successive iterations, is smaller than a pre-defined threshold, and (iv) determining whether the change in the codebook, between two successive iterations, is smaller than a pre-defined threshold.

For example, a codebook which maximizes the coverage may be designed as follows. The maximizing of the coverage may be defined as in Equation (9) as follows:

$$J = Pr_h \left\{ \max_{k=1,\ldots,K} |w_k^H h|^2 > \gamma \right\} \quad (9)$$

$$s.t. w_k(n) = e^{j\theta_k(n)}, n = 1, \ldots, N$$

where $\gamma$ is a performance threshold specified by the system requirements (when $$\gamma = 10^{(-\frac{x}{10})} N, J$$

and 1−J may be referred to as xdB-coverage and xdB-outage, respectively). To be able to adapt the proposed algorithm to the objective function corresponding to coverage, it may be rewritten as in Equation (10) as follows:

$$J = \frac{1}{L}\sum_{l=1}^{L} \text{sign}\left(\max_{k=1,\ldots,K} |w_k^H h_l|^2 - \gamma\right) \quad (10)$$

$$n(x) = \begin{cases} 1 & x \geq 0 \\ 0 & x < 0 \end{cases}.$$

The sign(x) function is not differentiable; accordingly it may be approximated by a sigmoid function defined as:

$$\text{igmoid}(x) = \frac{1}{1+e^{-\alpha x}},$$

where α is a metric to adjust the steepness of the curve. Thus, the algorithm can be applied by substituting $f(x) = \text{sigmoid}(x-\gamma)$.

In practice, phase shifters may be able to take only quantized values. For example, if the value of each phase shifter is specified by B bits, the codebook vectors may only be chosen from $2^{NB}$ feasible quantized vectors. In other words, if the value of each phase shifter is specified by B bits, and there are N phase shifters, the feasible set $\mathcal{W}$ (N), with an infinite number of entries, is reduced to a quantized set with $2^{NB}$ entries. As such, one solution for designing the desired codebook with K codewords would be an exhaustive search over all $$\binom{2^{NB}}{K}$$

combinations of feasible vectors to choose the best combination which optimizes the metric. However, the complexity of such an exhaustive method hinders the practicality of this method. Therefore, to design the codebook the projection approximation may be combined with the method of steps 110-150 (FIG. 1). In particular, at the end of each iteration, the found codewords may be projected to the closest vectors in the feasible set of quantized vectors. In addition, to avoid divergence, the codeword may only be updated when the new feasible option is better than the previous feasible option.

Some embodiments may provide a method for generating a codebook without imposing (unlike some alternate codebook design approaches) any particular structure on the beam vectors and their patterns, and which (unlike some alternate codebook design approaches) optimizes the performance according to the metric in Equation (11) as follows:

$$J = E_h\left\{f\left(\max_{k=1,\ldots,K} |w_k^H h|^2\right)\right\}, \quad (11)$$

$$s.t. w_k(n) = e^{j\theta_k(n)}, n = 1, \ldots, N$$

In some embodiments, the method described herein may be employed to generate both receive and transmit codebooks, resulting in improvements in one or more performance characteristics (for receiving or transmitting), e.g., average beamforming gain, capacity, bit error rate, or coverage.

Figure 3:
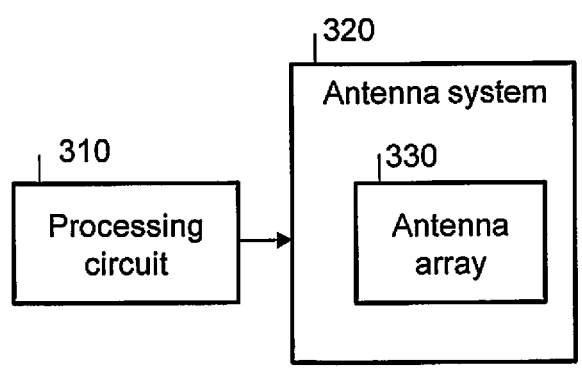
FIG. 3 is a block diagram of a system for receiving or transmitting communication signals, according to an embodiment.

FIG. 3 shows a system including a processing circuit 310 (discussed in further detail below), configured to generate a codebook according to some embodiments. The processing circuit 310 generates the codebook and feeds it to an antenna system 320, in which it controls an array of phase shifters each controlling the phase of a respective antenna of an antenna array 330.

The present disclosure describes improving the coverage and receive signal power in the beam sweeping process using hierarchy structure codebook and dynamic codebook selection scheme. A conventional implementation usually uses a fixed pre-defined beam sweeping codebook. Such a search method does not adapt to a variation of a status of a channel in a practical scenario. The present system and method dynamically select a beam sweeping codebook from a set of learned hierarchy codebooks. Training samples of channel information on analog antennas are required for the design of both the hierarchical codebooks and the dynamic codebook selection method.

At the beginning of each beam sweeping process, there may not be any prior knowledge of the channel. A receiver (Rx) beamforming codebook with larger coverage range i.e., wide beam should be applied to capture as much channel information as possible. Once some channel information is obtained, the Rx beamforming codebook may be changed to cover a smaller area with a higher beamforming gain i.e. a narrow beam with higher beamforming gain. A multilayer hierarchy codebook can serve this purpose well. For example, a 3 levels codebook, in a 2 sweeping symbol case, each codebook may have two codewords, a total of 7 codebooks (e.g., 1 codebook at a first upper level, 2 codebooks at a second middle level, and 4 codebooks at a third lower level), and 14 codewords (e.g., 2 codewords for each of the 7 codebooks). The upper level codebook may have a wider beam than the lower level codebook while the lower level codebook has a greater beamforming gain than the upper level codebook in an area of interest.

In an embodiment, a method and an apparatus each generate hierarchical codebooks. In an embodiment, a method and an apparatus each dynamically selects a beam forming codebook from the hierarchical codebooks. Training samples of channel information on analog antennas are required for generating hierarchical codebooks and dynamically selecting a codebook from the hierarchical codebooks.

In an embodiment, a method and an apparatus each generate a hierarchy codebook is a learning-based method, which receives channel samples as an input and outputs a hierarchy codebook that is more appropriate for a target channel.

In an embodiment, a beam forming codebook is dynamically selected for each beam sweeping period. In a conventional method, one codebook is used for all beam sweeping periods.

At the beginning of a beam sweeping process, there may not be any prior knowledge of a channel. In an embodiment, an Rx beamforming codebook with a large coverage range (e.g., a wide beam) is applied to capture as much channel information as possible. After channel information is obtained, the Rx beamforming codebook is changed to cover a smaller area (e.g., a narrow beam) but with a greater beamforming gain. In an embodiment, a multilayer hierarchy codebook is used to generate an initial wide beam and a subsequent narrow beam with a greater beamforming gain. For example, a 3 level (e.g., binary tree) codebook as illustrated in Table 1 below, in a 2 sweeping symbol case, where each codebook has two codewords for a total 7 codebooks (e.g., a binary tree of codebooks with 1 codebook at an upper level, 2 codebooks at a second level, and 4 codebooks at a third level) and 14 total codewords. The upper level codebook has a wider beam than a lower level codebook while a lower level codebook has a greater beamforming gain than the upper level codebook in an area of interest.

TABLE 1

| Codebook 1 | | | |
|---|---|---|---|
| Codebook 2 | | Codebook 3 | |
| Codebook 4 | Codebook 5 | Codebook 6 | Codebook 7 |

In an embodiment, a codebook with M codewords is generated. In an embodiment, a learning-based codebook design method is used which receives the number M and a set of channel samples as input. The learning-based codebook design method optimizes a metric such as average beamforming (ABF) gain or outage probability, outputs a codebook with M codewords, and divides the channel samples into M groups corresponding to the M codewords. The hierarchical learning-based codebook design method may use the codebook design method disclosed in U.S. patent application Ser. No. 16/354,024, filed in the USPTO on Mar. 14, 2019, the entire content of which is incorporated herein by reference.

In an embodiment, dynamic beamforming codebook selection may be a sequential decision for each beam sweeping period, where the selection of a codebook for a subsequent beam sweeping period is based on current and previous observations, where the current beamforming codebook selection affects the next observation. In an embodiment, a beam sweeping codebook selection method may be a Markov decision method.

Figure 4:
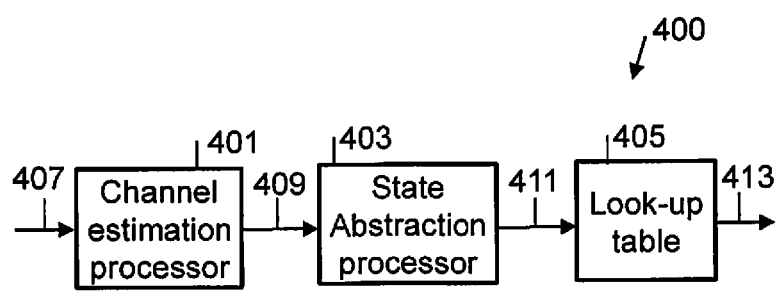
FIG. 4 is a block diagram of an apparatus for dynamically selecting a beamforming codebook, according to an embodiment.

FIG. 4 is a block diagram of an apparatus 400 for dynamically selecting a beamforming codebook, according to an embodiment.

Referring to FIG. 4, the apparatus 400 includes a channel estimation processor 401, a state abstraction processor 403, and a look-up-table 405. In an embodiment, the channel estimation processor 401 and the abstraction processor 403 may be included in one processor, or the functionality of each may be distributed amongst a plurality of processors.

The channel estimation processor 401 includes an input 407 and an output 409. The channel estimation processor 401 uses a beamforming codebook C_n in a beam sweeping period n to receive a signal R_n on the input 407 to obtain channel samples for estimating a channel and output the codebook C_n and the received R_n on the output 409.

The state abstraction processor 403 includes an input connected to the output 409 of the channel estimation processor 401 and an output 411. The state abstraction processor 403 receives the beam sweeping codebook C_n and the received signal R_n in beam sweeping period n and generates a state identifier (ID). The state ID is used as an index to the look-up table 405 in which beamforming codebooks are stored.

The look-up table 405 includes an input connected to the output 411 of the state abstraction processor 403 and an output 413. The look-up table 405 may be a Q-table, and the beamforming codebooks in the look-up table 405 may include beamforming codebooks from a hierarchy of beamforming codebooks in some order, where a beamforming codebook from the hierarchy of beam forming codebooks may appear one or more times in the look-up table 405, and where a beamforming codebook at a level in the hierarchy may be used to form a wider beam with a lower beamforming gain than a beamforming codebook at a lower level in the hierarchy. A codebook identified in the look-up table 405 by the state ID is output at the output 413 and may be used as a beamforming codebook (e.g., C_(n+1)) in the next beam sweeping period (e.g., beam sweeping period n+1). That is, beamforming codebook C_(n+1), which is to be used in the next beam sweeping period n+1, is determined by beamforming codebook C_n, which was used in the current beam sweeping period n and the signal R_n received in the current beam sweeping period n, and where the beamforming codebook C_n in the current beam sweeping period n was determined by beamforming codebook C_n−1, which was used in a previous beam sweeping period n−1, and a signal R_(n−1), which was received in the previous beam sweeping period n−1. The state abstraction processor 403 determines a state ID in beam sweeping period n by applying a function $f(\ )$ on the beamforming codebook C_n used in beam sweeping period n and the signal R_n received in beam sweeping period n (e.g., state IDs_n=$f$(C_n,R_n)).

For example, a hierarchy of 7 beamforming codebooks (C_1, C_2, . . . , and C_7) are included in the look-up table 405 and there are 10 possible state IDs. That is, the look-up table 405 may be a one-dimensional array (e.g., 10×1), where each element of the look-up table 405 includes one of the 7 beamforming codebooks. For example, the look-up table 405 may include the 7 beamform codebooks in an order C_7, C_6, C_5, C_4, C_3, C_2, C_1, C_3, C_2, and C_1, where beamforming codebooks C_1, C_2, and C_3 each appear twice in the look-up table 405. The state abstraction processor 403 uses the function $f(\ )$ on the beamforming codebook C_n used in beam sweeping period n and the signal R_n received in beam sweeping period n to determine the state ID (e.g., a number from the set of numbers from 1 to 10). If the state ID is 3 then C_5 is selected from the look-up table 405 as the beamforming codebook to be used in the next beam sweeping period n+1, because codebook C_5 is at the third index in the look-up table 405.

The look-up table 405 may include any set of beamforming codebooks. The codebooks in the look-up table 405 limit performance (e.g., block error rate (BLER) or capacity) of a system. An improved set of beamforming codebooks results from generating a hierarchy of beamforming codebooks, where a codebook at one level in the hierarchy may be used to form a wider beam with a lower beamforming gain than a beamforming codebook at a lower level in the hierarchy hierarchical structure, where there is a relationship between the coverages of beamforming codebooks at different levels of the hierarchy. For example, the coverage of all the beamforming codebooks at one level in the hierarchy is the same as the coverage of all of the codebooks at the next lower level in the hierarch. Since, there are more beamforming codebooks at the lower level, the coverage of each beamforming codebook at the lower level may be used to form a beam with a narrower coverage but with a higher beamforming gain than a beamforming codebook at the higher level.

The channel conditions may be such that the state ID determined in a beam sweeping period may select a beamforming codebook for the next beam sweeping period from the look-up table 405 that is at a different level in the hierarchy of beamforming codebooks than the beamforming codebook used in the current beam sweeping period. However, the channel conditions may also be such that the state ID determined in a beam sweeping period may select a beamforming codebook for the next beam sweeping period from the look-up table 405 that is at the same level in the hierarchy of beamforming codebooks as the beamforming codebook used in the current beam sweeping period.

Figure 5:
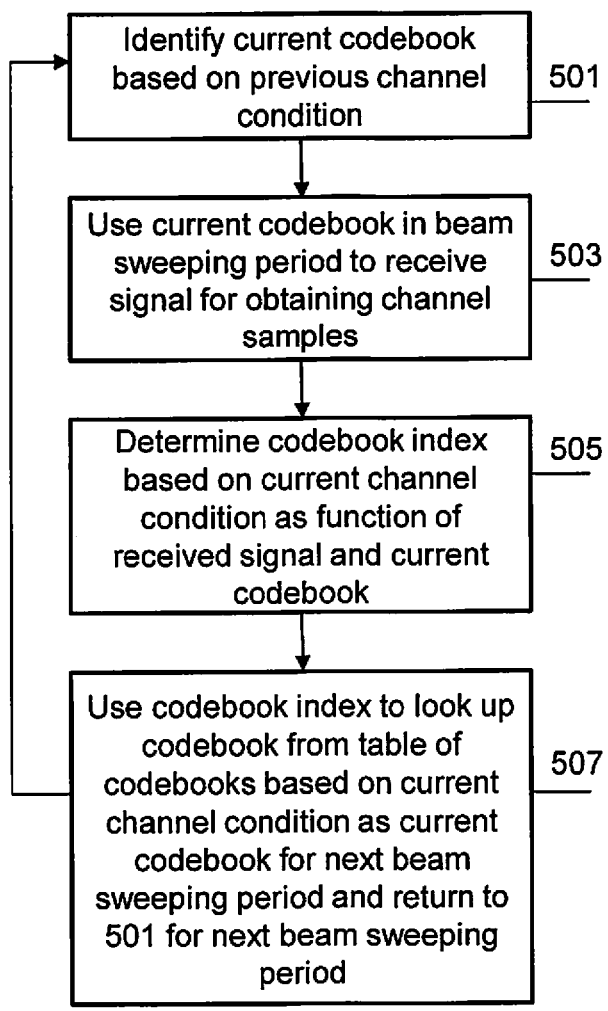
FIG. 5 is a flowchart of a method of dynamically selecting a beamforming codebook, according to an embodiment.

FIG. 5 is a flowchart of a method of dynamically selecting a beamforming codebook, according to an embodiment.

Referring to FIG. 5, at 501, the method identifies a current codebook C_n based on a previous channel condition. In an embodiment, the beamforming codebook C_n may be determined by a beamforming codebook C_n−1, which was used in a previous beam sweeping period n−1, and a signal R_(n−1), which was received in the previous beam sweeping period n−1. That is, the current codebook C_n may be determined in an immediately preceding iteration of the method.

At 503, the method uses the beamforming codebook C_n in a current beam sweeping period n to receive a signal R_n by the channel estimation processor 401 to obtain channel samples for estimating a channel.

At 505, the state abstraction processor 403 determines a codebook index (e.g., the state ID) based on the beam sweeping codebook C_n and the received signal R_n in beam sweeping period n and generates.

At 507, the codebook index is used an index to a table in which beamforming codebooks are stored to look up a beamforming codebook based on the current channel condition as indicated by the beam sweeping codebook C_n and the received signal R_n in beam sweeping period n, where the looked-up beamforming codebook (e.g., C_(n+1)) becomes the current codebook which will be used in the next beam sweeping period n+1. The method returns to 501 for the next beam sweeping period n+1. The look-up table may be a Q-table as described above.

Figure 6:
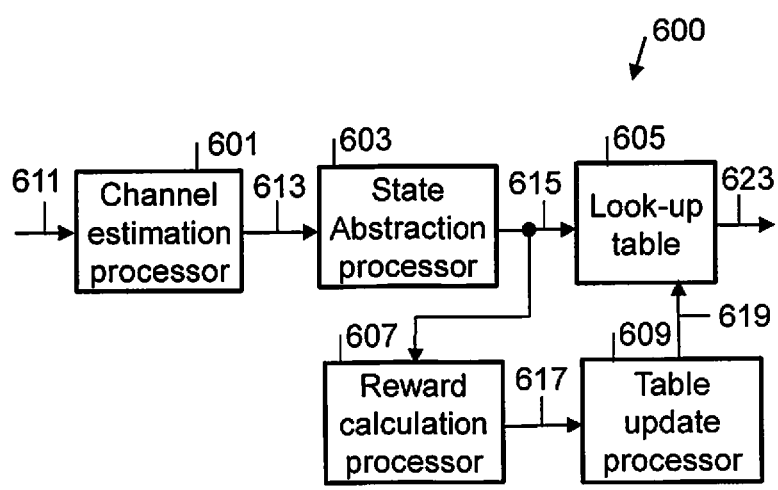
FIG. 6 is a block diagram of an apparatus for dynamically selecting a beamforming codebook, according to an embodiment.

FIG. 6 is a block diagram of an apparatus 600 for dynamically selecting a beamforming codebook, according to an embodiment.

Referring to FIG. 6, the apparatus 600 includes a channel estimation processor 601, a state abstraction processor 603, a look-up-table 605, a reward calculation processor 607, and a table update processor 609. In an embodiment, the channel estimation processor 601, the state abstraction processor 603, the reward calculation processor 607, and the table update processor 609 may be included in one processor, or the functionality of each may be distributed amongst a plurality of processors.

The channel estimation processor 601 includes an input 611 and an output 613. The channel estimation processor 601 uses a beamforming codebook C_n in a beam sweeping period n to receive a signal R_n on the input 611 to obtain channel samples for estimating a channel and output the codebook C_n and the received R_n on the output 613.

The state abstraction processor 603 includes an input connected to the output 613 of the channel estimation processor 601 and an output 615. The state abstraction processor 603 receives the beam sweeping codebook C_n and the received signal R_n in beam sweeping period n and generates a state identifier (ID). The state ID is used an index to the look-up table 605 in which beamforming codebooks are stored.

The look-up table 605 includes a first input connected to the output 615 of the state abstraction processor 603, a second input 619, and an output 623. The look-up table 605 may be a Q-table, and the beamforming codebooks in the look-up table 605 may include beamforming codebooks from a hierarchy of beamforming codebooks in some order, where a beamforming codebook from the hierarchy of beam forming codebooks may appear one or more times in the look-up table 605, and where a beamforming codebook at a level in the hierarchy may be used to form a wider beam with a lower beamforming gain than a beamforming codebook at a lower level in the hierarchy. A codebook identified in the look-up table 605 by the state ID and output at the output 623 may be used as a beamforming codebook (e.g., C_(n+1)) in the next beam sweeping period (e.g., beam sweeping period n+1). That is, beamforming codebook C_(n+1), which is to be used in the next beam sweeping period n+1, is determined by beamforming codebook C_n, which was used in the current beam sweeping period n and the signal R_n received in the current beam sweeping period n, and where the beamforming codebook C_n in the current beam sweeping period n was determined by beamforming codebook C_n−1, which was used in a previous beam sweeping period n−1, and a signal R_(n−1), which was received in the previous beam sweeping period n−1. The state abstraction processor 603 determines a state ID in beam sweeping period n by applying a function ƒ( ) on the beamforming codebook C_n used in beam sweeping period n and the signal R_n received in beam sweeping period n (e.g., state IDs_n=ƒ(C_n,R_n)).

The look-up table 605 may include any set of beamforming codebooks. The codebooks in the look-up table 605 limit performance (e.g., block error rate (BLER) or capacity) of a system. An improved set of beamforming codebooks results from generating a hierarchy of beamforming codebooks, where a codebook at one level in the hierarchy may be used to form a wider beam with a lower beamforming gain than a beamforming codebook at a lower level in the hierarchy hierarchical structure, where there is a relationship between the coverages of beamforming codebooks at different levels of the hierarchy. For example, the coverage of all the beamforming codebooks at one level in the hierarchy is the same as the coverage of all of the codebooks at the next lower level in the hierarch. Since, there are more beamforming codebooks at the lower level, the coverage of each beamforming codebook at the lower level may be used to form a beam with a narrower coverage but with a higher beamforming gain than a beamforming codebook at the higher level.

The channel conditions may be such that the state ID determined in a beam sweeping period may select a beamforming codebook for the next beam sweeping period from the look-up table 605 that is at a different level in the hierarchy of beamforming codebooks than the beamforming codebook used in the current beam sweeping period. However, the channel conditions may also be such that the state ID determined in a beam sweeping period may select a beamforming codebook for the next beam sweeping period from the look-up table 605 that is at the same level in the hierarchy of beamforming codebooks as the beamforming codebook used in the current beam sweeping period.

The reward calculation processor 607 includes an input connected to the output 615 of the state abstraction processor 603 and an output 617. The reward calculation processor 607 receives the state ID and computes a reward value based thereon and outputs the reward value on the output 617.

The table update processor 609 includes an input connected to the output 617 of the reward calculation processor 607 and an output connected to the second input 619 of the look-up table 605. The table update processor 609 receives the reward value and determines an action index on how the look-up table 605 should be updated (e.g., how the beamforming codebooks in the look-up-table should be changed) and outputs the action index and the reward value to the second input 619 of the look-up table 605. The look-up table 605 receives the action index and the reward value and updates the look-up table 605 based on the state ID, the action index, and the reward value.

Figure 7:
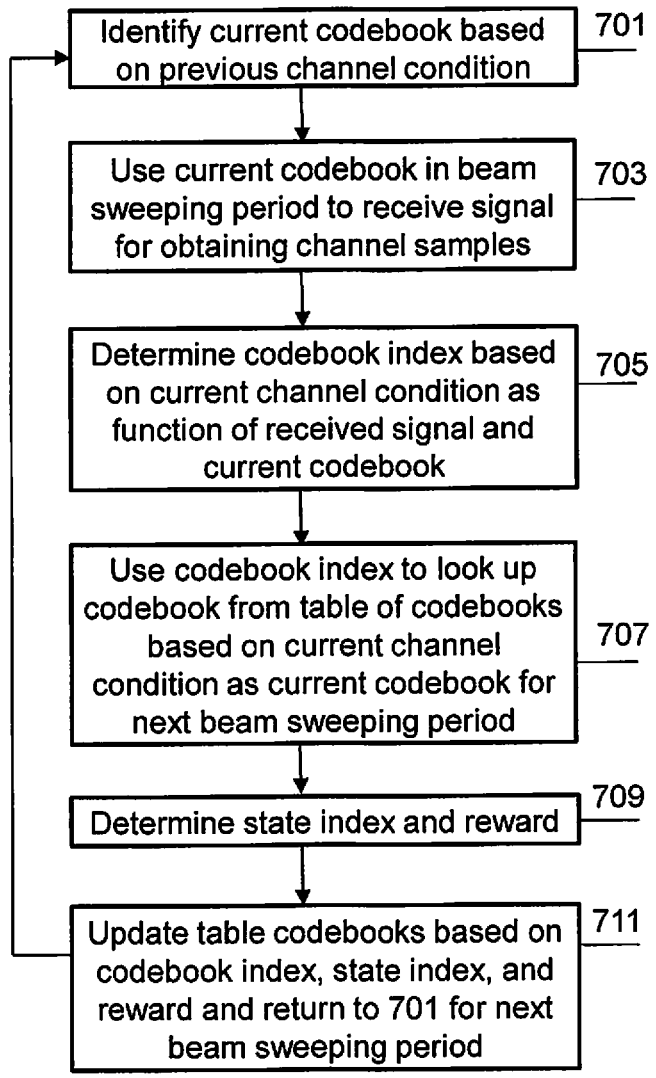
FIG. 7 is a flowchart of a method for dynamically selecting a beamforming codebook, according to an embodiment.

FIG. 7 is a flowchart of a method of dynamically selecting a beamforming codebook, according to an embodiment.

Referring to FIG. 7, at 701, the method identifies a current codebook C_n based on a previous channel condition. In an embodiment, the beamforming codebook C_n may be determined by a beamforming codebook C_n−1, which was used in a previous beam sweeping period n−1, and a signal R_(n−1), which was received in the previous beam sweeping period n−1. That is, the current codebook C_n may be determined in a immediately preceding iteration of the method.

At 703, the method uses the beamforming codebook C_n in a current beam sweeping period n to receive a signal R_n by the channel estimation processor 601 to obtain channel samples for estimating a channel.

At 705, the state abstraction processor 603 determines a codebook index (e.g., the state ID) based on the beam sweeping codebook C_n and the received signal R_n in beam sweeping period n.

At 707, the codebook index is used an index to the look-up table 605 in which beamforming codebooks are stored to look up a beamforming codebook based on the current channel condition as indicated by the beam sweeping codebook C_n and the received signal R_n in beam sweeping period n, where the looked-up beamforming codebook (e.g., C_(n+1)) becomes the current codebook which will be used in the next beam sweeping period n+1.

At 709, the reward calculation processor 607 receives the codebook index (e.g., the state ID) and computes a reward value based thereon.

At 711, the table update processor 609 receives the reward value and determines an action index on how the look-up table 605 should be updated (e.g., how the beamforming codebooks in the look-up-table should be changed) and outputs the action index and the reward value to the second input 619 of the look-up table 605. The look-up table 605 receives the action index and the reward value and updates the look-up table 605 based on the state ID, the action index, and the reward value. The method returns to 701 for the next beam sweeping period n+1.

Figure 8:
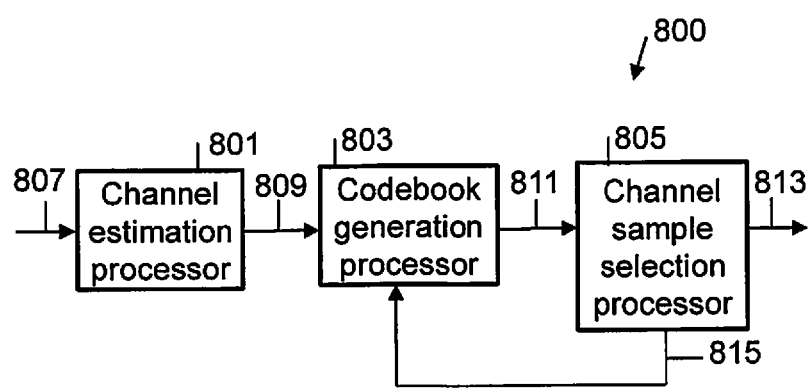
FIG. 8 is a block diagram of an apparatus for generating a hierarchy of beamforming codebooks, according to an embodiment.

FIG. 8 is a block diagram of an apparatus 800 for generating a hierarchy of beamforming codebooks, according to an embodiment.

Referring to FIG. 8, the apparatus 800 includes a channel estimation processor 801, a codebook generation processor 803, and a channel sample selection processor 805. In an embodiment, the channel estimation processor 801, the codebook generation processor 803, and the channel sample selection processor 805 may be included in one processor, or the functionality of each may be distributed amongst a plurality of processors.

The channel estimation processor 801 includes an input 807 and an output 809. The channel estimation processor 801 uses a beamforming codebook C_n in a beam sweeping period n to receive a signal R_n on the input 807 to obtain channel samples for estimating a channel and output the codebook C_n and the received R_n on the output 809.

The codebook generation processor 803 includes a first input connected to the output 809 of the channel estimation processor 801, a second input 815, and an output 811. The codebook generation processor 803 receives the obtained channel samples (e.g., $M^{L-1}$ sets of channel samples) as current sets of channel samples, where M indicates a type of codebook hierarchy (e.g., M=2 for a binary tree codebook hierarchy) and L indicates a current level in the codebook hierarchy (e.g., L=1 for a first or upper level of the codebook hierarchy). For example, for M=2 and L=1, one set of channel samples is obtained as a current set of channel samples in the first iteration of the method at 701. The codebook generation processor 803 selects a codebook learning function for each of the $M^{L-1}$ current sets of channel samples and generates a codebook for each of the M current sets of channel samples, where each of the generated codebooks includes M codewords.

The channel sample selection processor 805 includes an input connected to the output 811 of the codebook generation processor 803, a first output connected to the second input 815 of the codebook generation processor 803, and a second output 813. The channel sample selection processor 805 divides the channel samples within each set of the $M^{L-1}$ current sets of channel samples into M subsets, increments L, and, if another iteration is necessary as described in greater detail below, the M subsets of channel samples is provided to the codebook generation processor 803 via the second input 815 of the codebook generation processor 803 for the codebook generation processor 803 to generate another hierarchical tier of beamforming codebooks with the characteristics described below. For example, if M=2 and L=1, the one set of channel samples is divided into two subsets of channel samples in a first iteration and L is incremented to 2.

For a second iteration (e.g., for M=2 and L=2), the channel sample selection processor 805 further divides each of the two subsets of channel samples into two subsets of channel samples to produce four subsets of channel samples and increments L to 3. For example, in a first iteration, one set of channels samples may be used to generate a codebook that is used to form one beam to cover an entire area corresponding to the one set of channel samples (e.g., form one wide beam for the one set of channel samples) with a certain gain. In a second iteration, the one set of channel samples may be divided into two sets of channels samples (e.g., two subsets of the one set of channel samples), where each subset of channel samples is used to generate a codebook that is used to form one beam to cover a smaller area than that covered by the one set of channel samples from which the two subsets of channel samples are derived (e.g., form a narrower beam for a subset of the one set of channel samples) with a gain that is greater than that of the codebook generated in the first iteration of the method. The coverage of the two beams formed from the two codebooks generated at the second iteration may be equal to the coverage of the one beam formed by the one codebook generated in the first iteration as illustrated in Table 1 above. That is, Table 1 above illustrates that one codebook at the top level of the hierarchy of codebooks forms one first beam with one coverage, each of the two codebooks at the second level of the hierarchy of codebooks forms a second beam that has half the coverage of the one first beam, where the combination of the two second beams has the same coverage as the first beam, and each of the four codebooks at the third level of the hierarchy of codebooks forms a third beam that has half the coverage of each of the second beams, where the combination of the four third beams has the same coverage as the combination of the second beams, which is equal to the coverage of the one first beam. The same pattern may be implemented in a subsequent iteration. For example, at a third iteration, M=2 and L=3, there are four subsets of channel samples, four codebooks are generated, where each codebook includes 2 codewords, the four subsets of channel samples are each divided to form 8 subsets of channel samples for the next possible iteration, unless a condition for stopping is satisfied as described below in greater detail, and L is incremented to 4. The codebook generation processor 803 determines if L is equal to a predetermined value. Table 1 illustrates an example where there are three levels in the hierarchy of codebooks. Thus, Table 1 illustrates an example where the predetermined number for determining whether to stop is 4. When L is less than the predetermined number, another iteration is performed. When L is equal to the predetermined number, the codebook generation is terminated with the result being a hierarchy of codebooks with the characteristics described above.

In an embodiment, channel samples are needed to design a codebook. The channel samples may be obtained either from empirical measurements or drawn from a known distribution. In the latter case, an assumption is made on an angle of arrival (AoA) of the channel.

Figure 9:
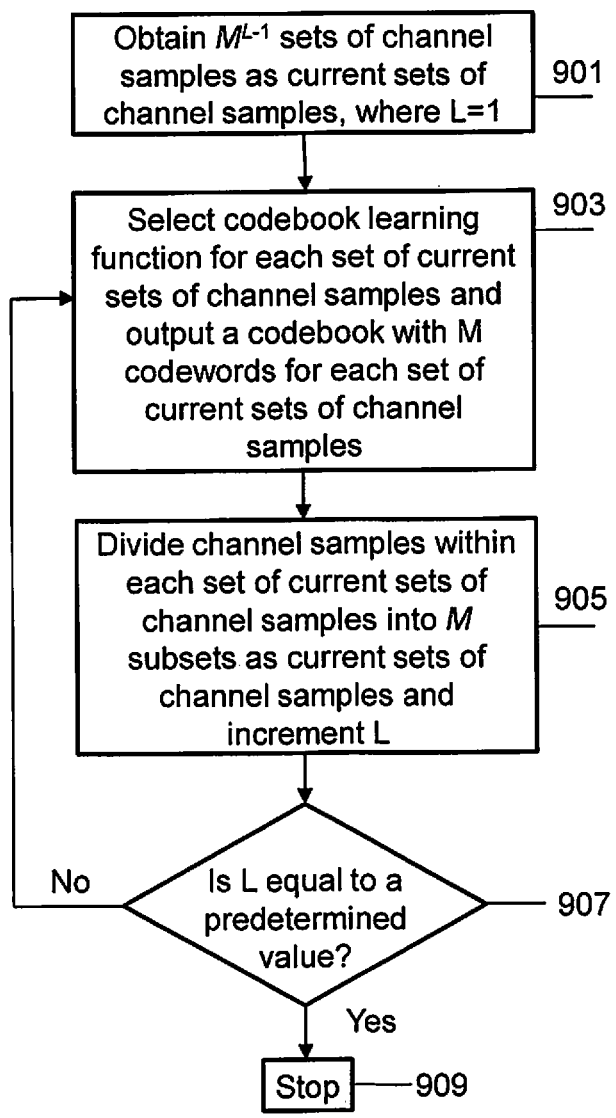
FIG. 9 is a flowchart of a method of generating a hierarchy of beamforming codebooks, according to an embodiment.

FIG. 9 is a flowchart of a method of generating a hierarchy of codebooks, according to an embodiment.

Referring to FIG. 9, $M^{L-1}$ sets of channel samples are obtained at 901 as current sets of channel samples, where M indicates a type of codebook hierarchy (e.g., M=2 for a binary tree codebook hierarchy) and L indicates a current level in the codebook hierarchy (e.g., L=1 for a first or upper level of the codebook hierarchy). For example, for M=2 and L=1, one set of channel samples is obtained as a current set of channel samples in the first iteration of the method at 901.

At 903, a codebook learning function is selected for each of the $M^{L-1}$ current sets of channel samples and a codebook is generated and output for each of the $M^{L-1}$ current sets of channel samples, where each of the generated codebooks includes M codewords. For example, if M=2 and L=1, then one codebook is generated in the first iteration of the method at 903. In an embodiment, the codebook may have a wide beam and a lower beamforming gain then codebooks generated at subsequent iterations of the method (e.g., subsequent and lower levels of the resulting codebook hierarchy). For a second iteration of the method at 903 (e.g., for M=2 and L=2), two codebooks are generated. In an embodiment, codebooks at a subsequent iteration (e.g., a lower level of the resulting codebook hierarchy) may be used to form a narrower beam than that of a codebook at a previous iteration of the method (e.g., an upper or higher level of the resulting codebook hierarchy) but have a greater beamforming gain than the codebook at the previous iteration of the method, because, as described below in greater detail at 905, the $M^{L-1}$ current sets of channel samples are subsets of channel samples of the previous iteration of the method.

At 905, the channel samples within each set of the $M^{L-1}$ current sets of channel samples are divided into M subsets and L is incremented. For example, if M=2 and L=1, the one set of channel samples is divided into two subsets of channel samples in the first iteration of the method and L is incremented to 2 at 905. For a second iteration of the method at 905 (e.g., for M=2 and L=2), each of the two subsets of channel samples are further divided into two subsets of channel samples to produce four subsets of channel samples and L is incremented to 3. For example, in a first iteration of the method, one set of channels samples may be used to generate a codebook that is used to form one beam to cover an entire area corresponding to the one set of channel samples (e.g., form one wide beam for the one set of channel samples) with a certain gain. In a second iteration of the method, the one set of channel samples may be divided into two sets of channels samples (e.g., two subsets of the one set of channel samples), where each subset of channel samples is used to generate a codebook that is used to form one beam to cover a smaller area than that covered by the one set of channel samples from which the two subsets of channel samples are derived (e.g., form a narrower beam for a subset of the one set of channel samples) with a gain that is greater than that of the codebook generated in the first iteration of the method. The coverage of the two beams formed from the two codebooks generated at the second iteration of the method may be equal to the coverage of the one beam formed by the one codebook generated in the first iteration of the method as illustrated in Table 1 above. That is, Table 1 above illustrates that one codebook at the top level of the hierarchy of codebooks forms one first beam with one coverage, each of the two codebooks at the second level of the hierarchy of codebooks forms a second beam that has half the coverage of the one first beam, where the combination of the two second beams has the same coverage as the first beam, and each of the four codebooks at the third level of the hierarchy of codebooks forms a third beam that has half the coverage of each of the second beams, where the combination of the four third beams has the same coverage as the combination of the second beams, which is equal to the coverage of the one first beam. The same pattern may be implemented in a subsequent iteration of the method. For example, at a third iteration of the method M=2 and L=3, there are four subsets of channel samples, four codebooks are generated, where each codebook includes 2 codewords, the four subsets of channel samples are each divided to form 8 subsets of channel samples for the next possible iteration of the method, unless a condition for stopping the method is satisfied as described below in greater detail, and L is incremented to 4 at 907.

At 907, the method determines if L is equal to a predetermined value. Table 1 illustrates an example where there are three levels in the hierarchy of codebooks. Thus, Table 1 illustrates an example where the predetermined number for determining whether to stop the method is 4. When L is less than the predetermined number, the method returns to 903 for another iteration of the method. When L is equal to the predetermined number, the method proceeds to 909.

At 909, the method stops.

Figure 10:
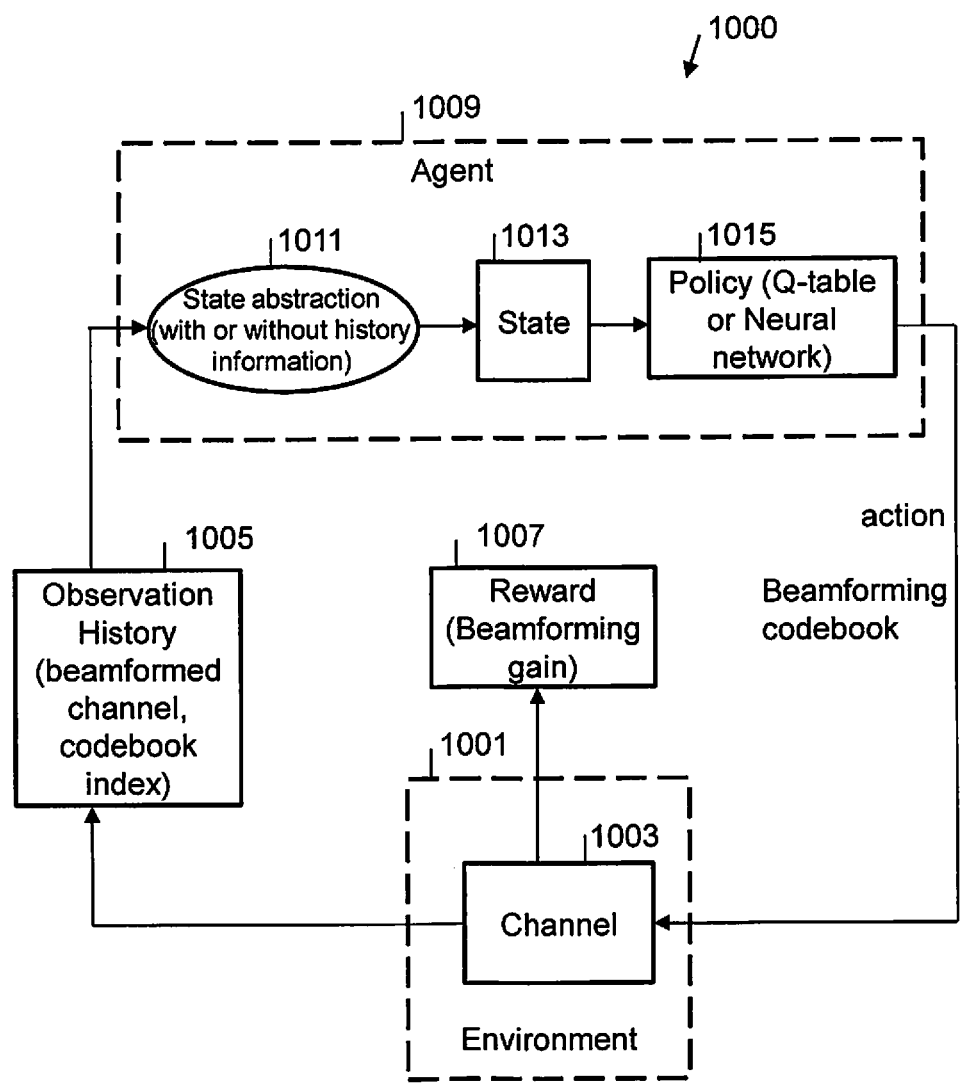
FIG. 10 is block diagram of an apparatus for dynamically selecting a beamforming codebook, according to an embodiment.

FIG. 10 is block diagram of an apparatus 1000 for dynamically selecting a beam sweeping codebook, according to an embodiment.

Referring to FIG. 10, the apparatus 1000 includes a channel generator 1001, a device configured to determine and record an observation history 1005, a device for determining beamforming gain 1007, and an agent 1009.

The channel generator 1001, includes an input for receiving an action and a beamforming codebook, a first output form providing a reward (e.g., beamforming gain), and a second output for providing channels samples. The channel generator 1001 is configured to determine a channel, for example by simulation.

The device configured to determine and record an observation history 1005 includes an input connected to the second output of the channel generator 1001 to receive channel samples and an output for providing an observation history determined from the channel samples, where the observation history may include a beamformed channel and a codebook index determined from the channel samples.

The device for determining the reward 1007 includes an input connected to the first output of the channel generator 1001 for receiving channel samples and an output for providing the beamforming gain or reward determined from the channel samples.

The agent 1009 includes a first input connected to the output of the device configured to determine and record an observation history 1005, a second input connected to the output of the device for determining the reward 1007, and an output for providing an action and a beamforming codebook. The agent 1009 includes a device configured to determine an abstract state 1011, a device configured to determine a state 1013, and a device for determining a policy 1015.

The device configured to determine an abstract state 1011 includes an input connected to the first input of the agent 1009 and an output. The device configured to determine an abstract state 1011 may determine a state abstraction with or without observation history information. The device configured to determine the state 1013 includes an input connected to the output of the device configured to determine an abstract state 1011 and an output. The device for determining a policy 1015 includes an input connected to the output of the device configured to determine an abstract state 1011 and an output connected to the output of the agent 1009. The device for determining the policy 1015 may be a Q-table or a neural network.

In an embodiment, beam sweeping is periodic, where there are M consecutive symbols in each beam sweeping slot that are used for beam sweeping. A codebook $C_n$ in Equation (12) below contains M code words (e.g., beamforming vectors) which are applied on the M consecutive symbols separately. On the m-th beam sweeping symbols, the m-th codeword $w_{m,n}$ is applied and a beam formed channel $\tilde{h}_{m,n}$ is observed as in Equation (13) below.

$$C_n = [w_{1,n}, w_{2,n}, \ldots, w_{M,n}] \tag{12}$$

$$\tilde{h}_{m,n} = w_{m,n} h_m \tag{13}$$

The dimensions for each parameter are specified with the variable $w_{m,n}:N_{RX} \times N_{RF}$, and $h_m:N_{RX} \times 1$ and $\tilde{h}_{m,n}:N_{RF} \times 1$, where $N_{RF}$: the number of RF chains (e.g., 1), $N_{RX} = N_{RX,RF} * N_{RF}$: the number of total receive analog antennas (e.g., 4), and $N_{RX,RF}$: the number of receive analog antennas per RF chain (e.g., 4).

To formulate the dynamic codebook selection problem, the following variables are defined.

$X_k$ includes all the analog channel information within a k-th beam sweeping period which includes $[h_1, h_2, \ldots, h_M]$.

$Y_k$ is a partial observation of an analog channel which is beamformed digital channel information $[\tilde{h}_{1,n_k}, \tilde{h}_{2,n_k}, \ldots, \tilde{h}_{M,n_k}]$.

$A_k$ is an action taken in the k-th beam sweeping period (e.g., select and apply beamforming codebook).

$S_k = (A_{k-1}, Y_k)$ is a state defined based on an observation $Y_k$ and an action $A_{k-1}$.

$R_k$ is a reward after taking action $A_{k-1}$, where the reward is a beamforming gain.

$k = 0, 1, 2, \ldots, \infty$ where k denotes an index of a beam sweeping period.

Figure 11:
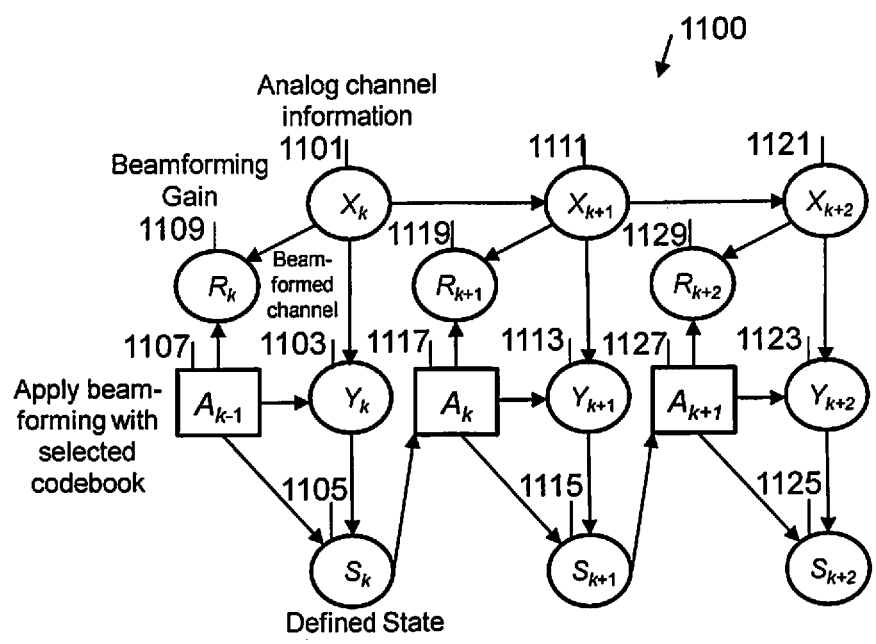
FIG. 11 is block diagram of an apparatus for dynamically selecting a beamforming codebook, according to an embodiment.

FIG. 11 is block diagram of an apparatus 1100 for dynamically selecting a beam sweeping codebook, according to an embodiment.

Referring to FIG. 11, the apparatus 1100 includes a first device 1101 configured to determine analog channel information, a first device 1103 configured to observe an analog channel, a first device 1105 configured to determine a state, a first device 1107 configured to select a codebook (e.g., taking an action), and a first device 1109 configured to determine a beamforming gain (e.g., a reward). The apparatus 1100 may include any number of sets of the first device 1101 configured to determine analog channel information, the first device 1103 configured to observe an analog channel, the first device 1105 configured to determine a state, the first device 1107 configured to select a codebook, and a first device 1109 configured to determine a beamforming gain, depending on how many levels there are in the beamforming codebook.

For example, FIG. 11 illustrates three sets of devices. The first set of devices includes the first device 1101 configured to determine analog channel information, the first device 1103 configured to observe an analog channel, the first device 1105 configured to determine a state, the first device 1107 configured to select a codebook, and the first device 1109 configured to determine a beamforming gain. The second set of devices includes a second device 1111 configured to determine analog channel information, a second device 1113 configured to observe an analog channel, a second device 1115 configured to determine a state, a second device 1117 configured to select a codebook, and a second device 1119 configured to determine a beamforming gain, depending on how many levels there are in the beamforming codebook. The third set of devices includes a third device 1121 configured to determine analog channel information, a third device 1123 configured to observe an analog channel, a third device 1125 configured to determine a state, a third device 1127 configured to select a codebook, and a third device 1129 configured to determine a beamforming gain, depending on how many levels there are in the beamforming codebook. However, the present disclosure is not limited thereto.

The first device 1101 configured to determine analog channel information includes a first output, a second output, and a third output.

The first device 1103 configured to observe an analog channel includes a first input connected to the first output of the first device 1101 configured to determine analog channel information, a second input, and an output.

The first device 1105 configured to determine a state includes a first input connected to the output of the first device 1103 configured to observe an analog channel, a second input, and an output.

The first device 1107 configured to select a codebook includes a first output connected to the second input of the first device 1103 configured to observe an analog channel, a second output connected to the second input of the first device 1105 configured to determine a state, and a third output.

The first device 1109 configured to determine a beamforming gain includes a first input connected to the second output of the first device 1101 configured to determine analog channel information and a second input connected to the second output of the first device 1107 configured to select a codebook.

Each addition set of the above-identified components is similarly connected with the additional connections that the third output of the first device 1101 configured to determine analog channel information is connected to an input of the second device 1111 configured to determine analog channel information, the output of the first device 1105 configured to determine a state is connected to an input of the second device 1117 configured to select a codebook, and a subsequent set of the above-identified components is connected similarly as the second set of the above-identified components.

In a general Markov decision method, a return $G_k$ is a total discounted reward from time-step t as in Equation (14) as follows:

$$G_k = R_{k+1} + \gamma R_{k+2} + \gamma^2 R_{k+3} + \ldots = \sum_{t=0}^{\infty} \gamma^t R_{k+t+1} \tag{14}$$

A discount $\gamma \in [0,1]$ is a present value of future rewards.

A policy $\pi$ is a distribution over actions given states as in Equation (15) as follows:

$$\pi(a|s) = \mathbb{P}[A_k = a | S_k = s] \quad (15)$$

A state-value function $v_\pi(s)$ of action a is an expected return starting from state s, and then following policy $\pi$ as in Equation (16) as follows:

$$v_\pi(s) = \mathbb{E}_\pi[G_k | S_k = s] \quad (16)$$

Action-value function $q_\pi(s, a)$ is an expected return starting from state s, taking action $\alpha$, and then following policy $\pi$ as in Equation (17) as follows:

$$q_\pi(s,a) = \mathbb{E}_\pi[G_k | S_k = s, A_k = a] \quad (17)$$

An optimal action-value function $q_*(s, a)$ is a maximum action-value function over all policies in Equation (18) as follows:

$$q_*(s, a) = \max_\pi q_\pi(s, a) \quad (18)$$

An optimal policy may be determined by maximizing over $q_*(s, a)$. If $q_*(s, a)$ is known, the optimal policy is immediately known.

To find an optimal policy, a temporal-difference (TD) off-policy learning method as expressed in Equation (19) below is used.

$$Q(S_k, A_k) \leftarrow Q(S_k, A_k) + \alpha\left[R_{k+1} + \gamma \max_a Q(S_{k+1}, a) - Q(S_k, A_k)\right] \quad (19)$$

The learned action-value function, Q, directly approximates $q_*$ an optimal action-value function, independent of the policy being followed. This dramatically simplifies the analysis of the algorithm and enables early convergence proofs. The policy still has an effect in that it determines which state-action pairs are visited and updated. However, all that is required for correct convergence is that all pairs continue to be updated. This is a minimal requirement in the sense that any method guaranteed to find optimal behavior in the general case must require it. Under this assumption and a variant of the usual stochastic approximation conditions on the sequence of step-size parameters, Q has been shown to converge with probability 1 to $q_*$.

A state $S_k$ is defined based on an action $A_k$ which is an index of a codebook applied at a k-th beam sweeping period, and a quantized channel gain $g_{m,n}$ as in Equation (20) as follows:

$$g_{m,n} = 10 \log 10(\tilde{h}_{m,n}^H \tilde{h}_{m,n}) \quad (20)$$

A quantized phase difference may be added between the beamformed channels on different symbols ($\tilde{h}_{m,n}$ with different m index) into the definition of state. However, this may lead to a much larger Q-table which may take longer to train and converge. In an embodiment, the codebook index and the quantized channel gain may be included in the definition of state.

Figure 12:
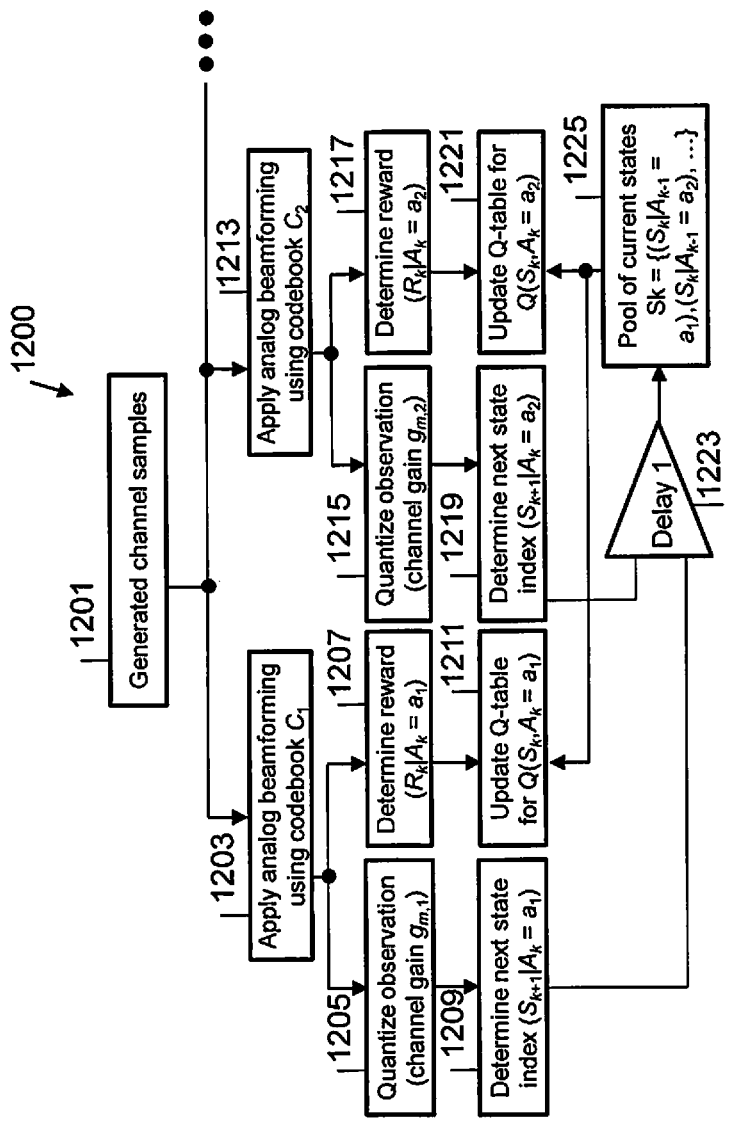
FIG. 12 is a block diagram of an apparatus of an off-policy learning method, according to an embodiment.

FIG. 12 is a block diagram of an apparatus 1200 for performing an off-policy learning method, according to an embodiment.

Referring to FIG. 12, the apparatus 1200 includes a device 1201 configured to obtain channel samples and multiple sets of devices. The first set of devices includes a first device 1203 configured to apply analog beamforming using a first codebook, a first device 1205 configured to quantize observations, a first device 1207 configured to determine a reward, a first device 1209 configured to determine a next state index, and a first device 1211 configured to update a Q-table. For each additional set of devices, the apparatus 1200 includes a set of the components described above. For example, FIG. 12 illustrates the components associated with two codebooks plus a delay device 1223 and a device for storing current states 1225. However, the present disclosure is not limited thereto. Any number of codebooks may be used, where each codebook would require a set of components described above that are associated with one codebook.

The components in FIG. 12 that are associated with a second set of devices include a second device 1213 configured to apply analog beamforming using the second codebook, a second device 1215 configured to quantize observations, a second device 1217 configured to determine a reward, a second device 1219 configured to determine a next state index, and a second device 1221 configured to update a Q-table.

For the example illustrated in FIG. 12, the device 1201 configured to obtain channel samples includes an output. In an embodiment, the device 1201 configured to obtain channel samples may generate channel samples by simulation.

The first device 1203 configured to apply analog beamforming using a first codebook includes an input connected to the output of the device 1201 configured to obtain channel samples, and an output. The first device 1205 configured to quantize observations includes an input connected to the output of the first device 1203 configured to apply analog beamforming using the first codebook, and an output. The first device 1205 configured to quantize observations may quantize a channel gain.

The first device 1207 configured to determine a reward includes an input connected to the output of the first device 1203 configured to apply analog beamforming using the first codebook, and an output. The first device 1209 configured to determine a next state index includes an input connected to the output of the first device 1205 configured to quantize observations, and an output. The first device 1211 configured to update a Q-table includes a first input connected to the output of the first device 1207 configured to determine a reward, and a second input.

The second device 1213 configured to apply analog beamforming using a second codebook includes an input connected to the output of the device 1201 configured to obtain channel samples, and an output. The second device 1215 configured to quantize observations includes an input connected to the output of the second device 1213 configured to apply analog beamforming using the second codebook, and an output. The second device 1215 configured to quantize observations may quantize a channel gain.

The second device 1217 configured to determine a reward includes an input connected to the output of the second device 1213 configured to apply analog beamforming using the second codebook, and an output. The second device 1219 configured to determine a next state index includes an input connected to the output of the second device 1215 configured to quantize observations, and an output. The second device 1221 configured to update a Q-table includes a first input connected to the output of the second device 1217 configured to determine a reward, and a second input.

The delay device 1223 includes a first input connected to the output of the first device 1209 configured to determine a next state index, a second input connected to the output of the second device 1219 configured to determine a next state index, and an output. The device for storing current states 1225 includes an input connected to the output of the delay device 1223, and an output connected to the second input of the first device 1211 configured to update a Q-table and second device 1221 configured to update a Q-table.

For a training channel sample h at the k-th training sample, the Q-table is updated as follows.

Measure an ABF gain of all beamforming vectors (m=1 . . . M) in each codebook (n=1 . . . N) as in Equations (21) and (22) as follows:

$$\tilde{h}_{m,n} = w_{m,n} h \quad (21)$$

$$g_{m,n} = 10 \log 10(\tilde{h}_{m,n}^H \tilde{h}_{m,n}) \quad (22)$$

Quantize the ABF gain to an integer between 0 and L, and compute the next state index for each of the action $a_n$ (e.g., apply codebook $C_n$ for beam sweeping) as in Equations (23) and (24) as follows:

$$\tilde{g}_{m,n} = \text{Quantize}(g_{m,n}) \quad (23)$$

$$s_n' = \text{Index\_mapping}(n, \tilde{g}_{1,n}, \tilde{g}_{2,n}, \ldots, \tilde{g}_{M,n}) \quad (24)$$

Compute the reward value for each action $a_n$ as in Equation (25) as follows:

$$R_n = \max_m g_{m,n} \quad (26)$$

For each state index s in the current states pool $S_k$, the Q-table value for state-action pair $Q(s, a_n)$ is updated as in Equation (27) as follows:

$$Q(s, a_n) = (1-\alpha) Q(s, a_n) + \alpha \left[ R_n + \gamma \max_{u \in A} Q(s_n', u) \right] \quad (27)$$

Update the states pool $S_{k+1}$, as in Equation (28) as follows:

$$S_{k+1} = [s_1', s_2', \ldots, s_n'] \quad (28)$$

Go back to the step of measuring an ABF gain for all beamforming vectors in each codebook for a next training channel sample.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the present disclosure.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although certain embodiments of a system and method for generating a codebook for analog beamforming have been specifically described and illustrated herein, many modifications and variations will be apparent to those skilled in the art. Accordingly, it is to be understood that a system and method for generating a codebook for analog beamforming constructed according to principles of this disclosure may be embodied other than as specifically described herein. The present disclosure is also defined in the following claims, and equivalents thereof.

What is claimed is:

1. An apparatus for determining a beamforming codebook for a next beam sweeping period, comprising:
   a channel estimation processor configured to receive a signal using a current beamforming codebook in a current beam sweeping period;
   a look-up table configured to store a plurality of beamforming codebooks;
   a state abstraction processor connected between the channel estimation processor and the look-up table, and configured to determine a codebook index based on a current channel condition as a function of the received signal and the current beamforming codebook, and select one of the plurality of beam sweeping codebooks in the look-up table as the beamforming codebook for the next beam sweeping period based on the codebook index.

2. The apparatus of claim 1, wherein the look-up table is further configured to store the plurality of beamforming codebooks based on a Q-learning based method.

3. The apparatus of claim 2, wherein the look-up table is further configured to store the plurality of beamforming codebooks in a hierarchy, wherein each beamforming codebook at one level of the hierarchy is configured to generate a wider beam than each beamforming codebook at a next lower level in the hierarchy.

4. The apparatus of claim 2, wherein the look-up table is further configured to store the plurality of beamforming codebooks in a hierarchy, wherein each beamforming codebook at one level of the hierarchy is configured to have a lower beamforming gain than each beamforming codebook at a next lower level in the hierarchy.

5. The apparatus of claim 1, further comprising:
   a reward calculation processor connected to the state abstraction processor and configured to determine a state index and a reward value based on the current channel condition; and
   a table-update processor connected between the reward calculation processor and the look-up table, and configured to update the plurality of beamforming codebooks in the look-up table based on the current beamforming codebook, the state index, and the reward value.

6. A method of determining a beamforming codebook for a next beam sweeping period, comprising:
   receiving, by a channel estimation processor, a signal using a current beamforming codebook in a current beam sweeping period;
   storing, in a look-up table, a plurality of beamforming codebooks;
   determining, by a state abstraction processor connected between the channel estimation processor and the look-up table, a codebook index based on a current channel condition as a function of the received signal and the current beamforming codebook; and
   selecting one of the plurality of beam sweeping codebooks in the look-up table as the beamforming codebook for the next beam sweeping period based on the codebook index.

7. The method of claim 6, wherein storing the plurality of beamforming codebooks comprises storing the plurality of beamforming codebooks based on a Q-learning based method.

8. The method of claim 7, wherein storing the plurality of beamforming codebooks comprises storing the plurality of beamforming codebooks in a hierarchy, wherein each beamforming codebook at one level of the hierarchy is configured to generate a wider beam than each beamforming codebook at a next lower level in the hierarchy.

9. The method of claim 7, wherein storing the plurality of beamforming codebooks comprises storing the plurality of beamforming codebooks in a hierarchy, wherein each beamforming codebook at one level of the hierarchy is configured to have a lower beamforming gain than each beamforming codebook at a next lower level in the hierarchy.

10. The method of claim 6, further comprising:
    determining, by a reward calculation processor connected to the state abstraction processor, a state index and a reward value based on the current channel condition; and
    updating, by a table-update processor connected between the reward calculation processor and the look-up table, the plurality of beamforming codebooks in the look-up table based on the current beamforming codebook, the state index, and the reward value.

11. An apparatus for generating a plurality of beamforming codebooks, comprising:
    a channel estimation processor configured to obtain $M^{L-1}$ sets of channel samples as current sets of channel samples, where M is an integer and L is greater than or equal to 1;
    a codebook generation processor connected to the channel estimation processor, wherein the codebook generation processor is configured to (a) select a codebook learning function for each set of current sets of channel samples; and
    a channel sample selection processor connected to the codebook generation processor,
    wherein the channel sample selection processor is configured to (b) divide the channel samples within each set of current sets of channel samples into M subsets as current sets of channel samples,
    wherein the channel sample selection processor determines whether L is equal to a predetermined value, and
    wherein the channel sample selection processor instructs the codebook generation processor to repeat (a) and wherein the channel sample selection processor repeats (b) if L is not equal to a predetermined value.

12. The apparatus of claim 11, wherein the codebook generation processor is further configured to select the codebook learning function based on a Q-learning based method and output a beamforming codebook with M codewords for each set of current sets of channel samples, and wherein the channel sample selection processor is further configured to output the plurality of beamforming codebooks if L is equal to the predetermined value.

13. The apparatus of claim 12, wherein the codebook generation processor is further configured to output the beamforming codebook in a hierarchy, wherein each beamforming codebook at one level of the hierarchy is configured to generate a wider beam than each beamforming codebook at a next lower level in the hierarchy.

14. The apparatus of claim 12, wherein the codebook generation processor is further configured to output the beamforming codebook in a hierarchy, wherein each beamforming codebook at one level of the hierarchy is configured to have a lower beamforming gain than each beamforming codebook at a next lower level in the hierarchy.

15. The apparatus of claim 11, wherein the channel estimation processor configured to obtain $M^{L-1}$ sets of channel samples from empirical measurements or from a distribution.

16. A method of generating a plurality of beamforming codebooks, comprising:
   (a) obtaining, by a channel estimation processor, M sets of channel samples as current sets of channel samples, where M is an integer and L is greater than or equal to 1;
   (b) selecting, by a codebook generation processor connected to the channel estimation processor, a codebook learning function for each set of current sets of channel samples;
   (c) dividing, by a channel sample selection processor connected to the codebook generation processor, the channel samples within each set of current sets of channel samples into M subsets as current sets of channel samples;
   (d) determining, by the channel sample selection processor, whether L is equal to a predetermined value; and
   (e) returning to (b) if L is not equal to the predetermined value.

17. The method of claim 16, wherein selecting the codebook learning function comprises selecting the codebook learning function based on a Q-learning based method, and further comprising:

outputting, by the codebook generation processor, a beamforming codebook with M codewords for each set of current sets of channel samples; and outputting, by a channel sample selection processor, the plurality of beamforming codebooks if L is equal to the predetermined value.

18. The method of claim 17, wherein outputting, by the codebook generation processor, the beamforming codebook comprises outputting the beamforming codebook in a hierarchy, wherein each beamforming codebook at one level of the hierarchy is configured to generate a wider beam than each beamforming codebook at a next lower level in the hierarchy.

19. The method of claim 17, wherein outputting, by the codebook generation processor, the beamforming codebook comprises outputting the beamforming codebook in a hierarchy, wherein each beamforming codebook at one level of the hierarchy is configured to have a lower beamforming gain than each beamforming codebook at a next lower level in the hierarchy.

20. The method of claim 16, wherein obtaining $M^{L-1}$ sets of channel samples comprises obtaining $M^{L-1}$ sets of channel samples from empirical measurements or from a distribution.

* * * * *